US012259506B2

(12) United States Patent
Lerendegui Marco et al.

(10) Patent No.: US 12,259,506 B2
(45) Date of Patent: Mar. 25, 2025

(54) DEVICE FOR THE SIMULTANEOUS DETECTION, IDENTIFICATION, QUANTIFICATION AND/OR LOCALIZATION OF GAMMA RADIATION AND NEUTRON SOURCES

(71) Applicants: CONSEJO SUPERIOR DE INVESTIGACIONES CIENTIFICAS (CSIC), Madrid (ES); UNIVERSITAT DE VALÈNCIA, Valencia (ES)

(72) Inventors: Jorge Lerendegui Marco, Valencia (ES); Javier Balibrea Correa, Valencia (ES); Cesar Domingo Pardo, Valencia (ES); Luis Caballero Ontanaya, Valencia (ES); Victor Babiano Suarez, Valencia (ES); Ion Ladarescu Palivan, Valencia (ES)

(73) Assignees: CONSEJO SUPERIOR DE INVESTIGACIONES CIENTIFICAS (CSIC), Madrid (ES); UNIVERSITAT DE VALENCIA, Valencia (ES)

(*) Notice: Subject to any disclaimer, the term of this patent is extended or adjusted under 35 U.S.C. 154(b) by 213 days.

(21) Appl. No.: 17/924,566

(22) PCT Filed: May 13, 2021

(86) PCT No.: PCT/ES2021/070342
§ 371 (c)(1),
(2) Date: Nov. 10, 2022

(87) PCT Pub. No.: WO2021/229132
PCT Pub. Date: Nov. 18, 2021

(65) Prior Publication Data
US 2023/0288584 A1  Sep. 14, 2023

(30) Foreign Application Priority Data
May 14, 2020  (ES) ............... ES202030443

(51) Int. Cl.
*G01T 1/29*  (2006.01)
*G01J 5/08*  (2022.01)
(Continued)

(52) U.S. Cl.
CPC ............ *G01T 1/295* (2013.01); *G01J 5/0859* (2013.01); *G01T 1/1603* (2013.01);
(Continued)

(58) Field of Classification Search
CPC ....... G01T 1/299; G01T 1/1603; G01J 5/0859
See application file for complete search history.

(56) References Cited

U.S. PATENT DOCUMENTS 8,519,343 B1 *  8/2013  Mihailescu ........... G01T 1/1647
250/367
2003/0165211 A1 *  9/2003  Grodzins ................ G01T 3/06
376/155
(Continued)

FOREIGN PATENT DOCUMENTS

GB  1016806.0 A  11/2012

OTHER PUBLICATIONS

Alexis Poitrasson-Riviere, J. Kyle Polack, Michael C. Hamel, Dietrich D. Klemm, Kai Ito, Alexander T. McSpaden, Marek Flaska, Shaun D. Clarke, Sara A. Pozzi, Alice Tomanin, Paolo Peerani, "Angular-resolution and Material-Characterization Measurements for a Dual-Particle Imaging System with Mixed-Oxide Fuel", Article, Jul. 3, 2015, 278-284, vol. 797, Nuclear Instruments and Methods in Physics Research A.
(Continued)

*Primary Examiner* — Hugh Maupin
(74) *Attorney, Agent, or Firm* — Hayes Soloway PC (57) ABSTRACT

A mechanical collimator receives particles from a gamma radiation emission source and/or neutron emission source, a material that absorbs neutrons and is virtually transparent to
(Continued)

gamma radiation A first detector includes a scintillator crystal with neutron-gamma discrimination capability and a position-sensitive photosensor, coupled to the mechanical collimator. One or more detector blocks have scintillator crystals of gamma or neutron-gamma radiation and position-sensitive photosensors, after the first detector, on a face opposite the mechanical collimator. A processing and acquisition module is connected to the detectors The device is suitable for use in inspections relating to nuclear safety, port safety, nuclear threats and accidents, and hadron-therapy treatments and nuclear medicine.

18 Claims, 2 Drawing Sheets

(51) Int. Cl.
  *G01T 1/16* (2006.01)
  *G01T 1/20* (2006.01)
  *G01T 1/202* (2006.01)
  *G01T 1/24* (2006.01)
(52) U.S. Cl.
  CPC ............ *G01T 1/2018* (2013.01); *G01T 1/202* (2013.01); *G01T 1/24* (2013.01)

(56) References Cited

U.S. PATENT DOCUMENTS

| | | | |
|---|---|---|---|
| 2008/0149838 A1* | 6/2008 | Parvin ................... | G01T 1/2008 250/356.2 |
| 2010/0163744 A1* | 7/2010 | Lacy ........................ | G01T 1/18 250/394 |
| 2012/0256094 A1* | 10/2012 | Pozzi ..................... | G01V 5/281 250/366 |
| 2017/0219720 A1* | 8/2017 | Cortesi ................. | G01T 1/2935 |
| 2020/0309973 A1* | 10/2020 | White ....................... | G01T 3/00 |

OTHER PUBLICATIONS

L. Tagawa, J. Kataoka, K. Sueoka, K. Fujieda, T. Kurihara, M. Arimoto, S. Mochizuki, T. Maruhashi, T. Toshito, M. Kimura, T. Inaniwa, "Development of Novel Neutron Camera to Estimate Secondary Particle Dose for Safe Proton Therapy", Article, 2019, 31-33, vol. 936, Nuclear Inst. and Methods in Physics Research, A.

D. Herzo, R. Koga, W.A. Millard, S. Moon, J. Ryan, R. Wilson, A.D. Zych and R.S. White, "A Large Double Scatter Telescope for Gamma Rays and Neutrons", Article, 1975, 583-597, vol. 123, Nuclear Instruments and Methods.

Xiuzuo Liang, Xiaoyu Pang, Daquan Cao, Xuanhou Hu, Daowu Li, Zhiming Zhang, Shuangquan Liu, Tingting Hu, Yiwen Zhang, Xiaoming Wang, Fanhui Meng, Jipeng Zhang, Xiaorou Han, Qi Liu, Likun Liu, Zhibo Zhou, Jilong Zhang, Long Wei, "Self-Supporting Design of a Time-Encoded Aperture, Gamma-Neutron Imaging System", Article, 2020, 1-8, vol. 951, No. 162964, Nuclear Inst. and Methods in Physics Research, A.

A. Giaz, L. Pellegri, F. Camera, N. Blasi, S. Brambilla, S. Ceruti, B. Million, S. Riboldi, C. Cazzaniga, G. Gorini, M. Nocente, A. Pietropaolo, M. Pillon, M. Rebai, M. Tardocchi, The CLYC-6 and CLYC-7 Response to y-Rays, Fast and Thermal Neutrons, Article, 2016, 132-139, vol. 810, Nuclear Instruments and Methods in Physics Research A.

Chad M. Whitney, Lakshmi Soundara-Pandian, Erik B. Johnson, Sam Vogel, Bob Vinci, Michael Squillante, Jarek Glodo, James F. Christian, "Gamma-Neutron Imaging System Utilizing Pulse Shape Discrimination with CLYC", Article, 2015, 346-351, vol. 784, Nuclear Instruments and Methods in Physics Research A.

S. Mochizuki et al., "First Demonstration of Aerial Gamma-Ray Imaging Using Drone for Prompt Radiation Survey in Fukushima", Article, 2017, 1-12, P11014, Journal of Instrumentation.

R. Pavlovsky, J.W. Cates, W.J. Vanderlip, T.H.Y. Joshi, A. Haefner, E. Suzuki, R. Barnowski, V. Negut, A. Moran, K. Vetter, and B.J. Quiter, "3D Gamma-Ray and Neutron in Real-Time with the Localization and Mapping Platform from Unmanned Aerial Systems and Man-Portable Configurations", Abstract, 2019, 1-8.

Alexander Barzilov and Amber Guckes, "Time Encoded Imaging of Neutrons and Photons Using CLYC Detector Equipped with a Dual Mode Collimator", Article, Jan. 2019, 78-83, vol. 229, No. 1, Sensors & Transducers.

V. Babiano-Suarez, J. Balibrea-Correa, L. Caballero, D. Calvo, C. Domingo-Pardo, I. Ladarescu and J. Lerendegui-Marco, "First Compton Imaging Tests with i-TED", Journal, 2019, 1-3, IEEE.

Hajir Al Hamrashdi, David Cheneler, and Stephen D. Monk, "A Fast and Portable Imager for Neutron and Gamma Emitting Radionuclides", Article, 2020, 1-17, vol. 953, No. 163253, Nuclear Inst. and Methods in Physics Research, A.

* cited by examiner

DEVICE FOR THE SIMULTANEOUS DETECTION, IDENTIFICATION, QUANTIFICATION AND/OR LOCALIZATION OF GAMMA RADIATION AND NEUTRON SOURCES

CROSS-REFERENCE TO RELATED APPLICATIONS AND PRIORITY

This patent application claims priority from PCT Application No. PCT/ES2021/070342 filed May 13, 2021. This patent application is herein incorporated by reference in its entirety.

OBJECT OF THE INVENTION

The object of the invention is a portable device for simultaneous detection, quantification, identification and spatial location or visualisation of both neutron emission sources and of gamma radiation sources, suitable for use, for example, in inspections relating to nuclear safety, port safety, nuclear threats and accidents, medical physics and other applications.

BACKGROUND OF THE INVENTION

Most devices for the detection of radiation and of radioactive sources are optimised for measuring a specific type of radiation or subatomic particles. Gamma radiation and neutrons exhibit a high ability for penetrating matter, and as a result are particularly useful for the detection and location of radioactive sources that emit this type of radiation or particles and may be shielded or concealed by other materials.

This is the case of the radiation emitted, for example, in spent uranium fuel rods from nuclear power plants, which are stored in water tanks. In storage control tasks and in non-proliferation inspection tasks, a system which allows the simultaneous measurement and visualisation of both gamma radiation and neutrons emitted by the fuel to be inspected is useful. In the case of illegal trafficking of spent fuel, said fuel can be concealed by a material that absorbs gamma radiation so that it can be concealed during inspections carried out by the authorities. In this sense, both the detection and identification of gamma radiation and of neutrons and the location of their origin may help to improve the identification, as described in the article [A. Poitrasson-Riviere et al., Nucl. Instr. and Meth. in Phys. Res. A 797 (2015) 278-284].

Alternatively, in medical applications, gamma and neutron radiation can provide very valuable information in treatments with proton or heavier ion beams. In this type of cancer therapy, a significant fraction of the secondary dose that the patient receives is due to the neutrons produced during the treatment. Joint monitoring of the spatial distribution of neutrons and of gamma radiation can be useful for quantifying this secondary dose and for determining the penetration range of the primary hadron beam.

There are optimised systems for the detection of gamma radiation and systems designed for the detection of neutrons. There are also devices, such as the one described in document US2012/0256094A1, for example, which allow both types (gamma radiation and neutrons) to be simultaneously detected and allow a spatial location to be performed or the spatial distribution of the emission sources to be imaged.

Existing hybrid or dual neutron and gamma imaging systems are generally based on the use of organic (liquid or plastic) scintillators for the detection of neutrons. This detection technology is applicable for the detection of neutrons the energy of which is equal to or greater than several hundreds of keV (>200-300 keV). This means that these devices are sensitive only to fast and intermediate energy neutrons, and do not have slow neutron (neutron energies around eV) or thermal neutron (energies of several tenths of eV) imaging capability. This limitation represents a series of disadvantages and drawbacks in different applications.

In medical applications, during the treatment of tumours with ion (proton, carbon, etc.) beams, the production of neutrons is an important aspect in terms of controlling the radiation dose that the patient receives. The neutrons that are generated in treatments of this type fundamentally have a thermal or low-energy component, and another fast or high-energy contribution.

At present, there are devices for measuring the neutron dose across the entire energy spectrum, but these devices do not exhibit the capability to image the spatial origin of neutrons. There are systems with imaging capability for neutrons, but, like those systems previously described, these systems are applicable in the high-energy neutron (fast neutron) range, such as the system described in the article [L. Tagawa et al., Nucl. Instr. and Meth. in Phys. Res. A 936 (2019) 31-33]. A device capable of measuring and visualising the spatial distribution of gamma radiation and of thermal and slow neutrons would represent complementary information that is useful and vital for improving treatments of this type.

In safety inspections related to monitoring spent nuclear fuel or sensitive material (plutonium, uranium) contraband, the detection and visualisation of thermal neutrons is important because this neutron energy range is the predominant range when shielding the radioactive sample with hydrogenated materials (water, polyethylene) for attenuating or concealing same. The systems for detection referred to above are primarily sensitive to the fast or high-energy neutron component (>100-200 keV). A system for simultaneous detection of neutrons and gamma radiation particularly sensitive to the thermal component of neutrons would represent a significant improvement with respect to the existing techniques.

The organic scintillators used for the most part in dual neutron-gamma cameras for the detection of neutrons exhibit very low intrinsic detection efficiency and portability. In the applications described above, this represents a further disadvantage limiting their applicability.

Another disadvantage in the use of organic scintillators in dual neutron-gamma cameras is due to the limited energy resolution of organic scintillators, which directly results in a gamma image resolution that is less than what could be obtained with inorganic scintillators. This is because in systems of this type, radiation imaging is obtained by the Compton technique. According to the Compton scattering law, angular or image resolution depends directly on the energy resolution of the detector used, as described in the first dual neutron-gamma Compton cameras [D. Herzo et al., Nucl. Instr. and Methods, 123 (1975) 587-597].

In general, for the reasons set forth, the mentioned systems are large in size, which limits their applicability in a number of scenes, such as industrial applications where inspection space is restricted, or inspections related to nuclear safety which require being portable (plutonium contraband) and with nuclear accidents (such as in Fukushima) where the only access to the field of interrogation is by means of unmanned aerial missions, which generally have a very limited autonomy and load.

In medical applications, the volume of the system for detection may also represent a significant limitation. Namely, in clinical treatments with proton beams and with heavy ion beams, surrounding elements that may hinder rapid patient access and care should emergency assistance be required during treatment are not allowed.

The limited energy resolution of organic scintillators and their low spectroscopic response also results in little or zero capability for identifying and quantifying the type of gamma radiation-emitting isotope, as is the case of the system described in the publication [X. Liang, et al., Nucl. Instr. Meth. in Phys. Res. A 951 (2020) 162964].

Part of these limitations, particularly those referring to the identification of radioisotopes, energy resolution and image resolution, can be improved by using inorganic scintillators presenting neutron-gamma discrimination capability and exhibiting high-energy resolution, as described in the article [A. Giaz et al., Nucl. Instr. and Meth. in Phys. Res. A 810 (2016) 132-139]. However, existing systems based on inorganic crystals generally use coded mask collimators for neutron and gamma imaging, such as the system described in document [C. M. Whitney et al., Nucl. Instr. Meth. in Phys. Res. A 784 (2015) 346-351]. These collimators have several disadvantages, particularly in reference to portability, given that they are manufactured with heavy elements (tungsten or lead and cadmium), which limits their use in applications such as unmanned aerial inspections or other similar uses requiring compact, lightweight devices with a broad field of view. Moreover, systems of this type based on mechanical collimation have a reduced aperture and a relatively narrow field of view, as well as low efficiency for gamma radiation detection. This entails long measurement times or the need to take multiple measurements to characterise an environment.

Alternatively, there are portable and lightweight systems for dual neutron-gamma detection that are suitable for unmanned aerial missions. However, current systems of this type only have gamma imaging capability and not neutron imaging capability, such as the device used in this paper [S. Mochizuki, et al., Journal of Instrumentation (2017) 12 P11014] for the aerial inspection of the area surrounding the nuclear accident at Fukushima Daiichi. Existing portable systems which are sensitive to gamma radiation and to neutrons lack intrinsic spatial or angular resolution for simultaneously visualising gamma radiation and neutron radiation focal point(s) [R. Pavlovsky et al., eprint arXiv: 1908.06114 (2019)]. In this latter case, the visualisation and location of the sources requires performing a systematic scan of the area with the measurement device in order to subsequently estimate the location of the sources by means of statistical methods based on the position of the measurement device, the solid angle subtended solid angle and the count rate in each position of the measurement device. This method presents clear disadvantages as it increases the measurement time and in many cases requires intervention in the measurement area to change the position of the system for detection.

DESCRIPTION OF THE INVENTION

The device for detection of gamma radiation and neutron sources, object of the present invention, allows circumventing the limitations described in the preceding paragraph by means of:

- a small volume, lightweight and highly portable device capable of combining in a single device and in a single measurement capabilities of detection, quantification, identification and spatial location of both gamma radiation and neutrons,
- a device with high spectroscopic resolution for gamma radiation, which allows the type of emitting radioisotope to be identified and its presence to be quantified,
- a device with high image resolution of image for both gamma radiation and for neutron emission sources,
- a device capable of detecting gamma radiation with high efficiency and sufficient energy resolution in order to identify emitting radioisotopes and provide their location in space for a wide gamma radiation energy range,
- a device capable of detecting neutrons and providing an image of the emission source, primarily in the thermal-slow neutron energy range, where it can even reach up to intermediate energies in the order of hundreds of keV.

The present invention consists of a special combination of lightweight mechanical collimation for the detection of neutrons and electronic (or Compton) collimation for the detection of gamma radiation, thus being able to provide an image of neutron (intermediate, thermal and slow) and gamma radiation emission sources simultaneously. This allows neutron and radiation emission sources in a field environment or scene to be located simultaneously in a single fixed measurement (measurement pose or position). It also allows several individual measurements or measurement poses to be combined in order to obtain more complete information about the spatial distribution of emission sources.

The main advantage compared to existing techniques lies in being a lightweight and portable device suitable for the visualisation of thermal and slow neutron emission sources, while at the same time it allows a hybrid neutron-gamma image of emission sources to be formed and the nature of gamma radiation-emitting isotopes to be identified by means of high-resolution spectroscopy.

In the present invention, the implementation of a lightweight mechanical collimator for neutrons allows the Compton technique to be applied for the visualisation of gamma radiation. This represents an advantage compared to existing systems, since it allows a detection efficiency and a field of view that are significantly better than those of similar systems based on coded masks to be obtained. Measurement times or the number of measurements to be taken to characterise a certain environment can thereby be reduced.

Unlike other neutron-gamma cameras, the present invention is primarily sensitive to the thermal and slow component of the neutron spectrum. This makes the invention particularly useful in the area of controlling radioactive material, safety and nuclear threats, as well as in medical and industrial applications.

Namely, the device for simultaneous detection of gamma radiation and neutron sources, receiving gamma radiation particles and/or neutrons from an emission source, comprises:

- a mechanical collimator for neutrons, intended for being positioned in front of the emission source, which does not significantly absorb or affect gamma radiation, and preferably a "pin-hole" type collimator, acting as a pin-hole camera for the detection of the neutron emission source,
- a detector module, located after the mechanical collimator, in the side opposite the emission source, formed by several detection volumes, where at least one of them presents neutron-gamma discrimination capability and where one or several of the detection volumes may present spatial sensitivity or the capability to locate the point where energy has been deposited by means of gamma or neutron interaction. Namely, in one aspect of the invention, the detector module comprises a detector with neutron-gamma discrimination capability and at least one gamma radiation detector which, together with the aforementioned, forms a Compton camera for gamma rays, a processing and acquisition module, connected to the detector module, with the capability to synchronise the detection volumes in temporal coincidence and to process the signals generated in said module, and optionally, a visualisation module, which allows a reconstructed image or the spatial location of the gamma radiation and/or neutron emission source to be visualised.

Communication between the detector module, the processing and acquisition module and, optionally, the visualisation module can be carried out by wiring or wirelessly.

Gamma radiation detectors acting as a Compton detector are based on the simultaneous measurement of several gamma radiation interactions in the sensitive detection volume. By measuring the position and the energy deposited in said interactions, it is possible to reconstruct a cone of possible incidence directions of radiation for each recorded event, the aperture of which is determined by the Compton law for electromagnetic radiation scattering. A number of Compton imaging techniques can be applied to this data in order to precisely reconstruct the position of the radiation source and its energy spectrum.

To that end, several gamma radiation detectors sensitive to energy and to positions are normally used. All that is required for imaging the neutron source is the collimator for neutrons and for one of the detectors of the system to be sensitive to neutrons. The device does not need to comprise more than one detector with neutron/gamma discrimination capability since, at least for Compton gamma radiation imaging, the events must be recorded using the temporal coincidence technique.

This allows the device to be optimised in terms of energy resolution parameters, efficiency and other aspects. Moreover, part of all the detectors may present identification or neutron/gamma discrimination capability, which can allow for an optimisation of the system in reference to the sharpness of the neutron image or to the signal-to-background ratio in the radiation and neutron images obtained with this system.

Neutron imaging in the visualisation module is achieved as a result of the mechanical collimator, preferably a pin-hole type collimator and preferably manufactured with a material with poor gamma radiation absorption capacity but high neutron absorption capacity. There are several suitable materials, such as lithium-doped polyethylene. Namely, polyethylene with lithium isotopically enriched with $^6$Li is particularly suitable due to the absence of secondary radiation in the absorption of the neutron. Other alternatives comprise borated polyethylene, lithium hydride, lithium hydride enriched with $^6$Li, etc.

The mechanical collimator is coupled to the detector module, namely to the detector with neutron-gamma discrimination capability. The geometry is thereby optimised for the optical reconstruction of the image of the neutron source.

The mechanical collimator has the advantage that it essentially does not interfere with gamma imaging. Furthermore, as it is much more lightweight than mechanical collimators used for gamma imaging by means of the pin-hole collimation technique (typically made of tungsten or lead), it allows for portability of the device.

As indicated, the mechanical collimator for neutron imaging is preferably a pin-hole type collimator or pin-hole camera, comprising in this case an inlet opening for neutrons. Alternatively, mechanical collimators for neutrons with apertures of the slit, parallel hole, converging, diverging, multi pin-hole or coded mask collimator type can also be used.

In another aspect of the invention, the mechanical collimator is a pin-hole type collimator and has a focal distance (distance between the inlet opening and its rear part where the first detector is positioned) which can be mechanically modified such that it allows the useful field of view of the neutron image and the spatial resolution to be optimised.

In another aspect of the invention, the mechanical collimator for neutrons can be removed or uncoupled from the detector module. This achieves being able to reconstruct the gamma image without interference from the collimator and to significantly increase neutron detection efficiency. In this aspect, it is still feasible to reconstruct the neutron image using alternative technical statistics if several systematic measurements are taken environment around the emission source.

In another aspect of the invention, in the detection module, the sensitive volume with discrimination capability may comprise a single monolithic crystal or a plurality of scintillation crystals for the detection of gamma radiation and neutrons, and a single position-sensitive photosensor or a plurality of photosensors for forming an electrical pulse that can be processed in the processing and acquisition module in order to amplify the electrical signal produced by the photosensors.

In this case, the photosensors are preferably of pixelated type photosensors or have the capability to identify or provide information about the location of the gamma radiation and neutron interaction point or points in the sensitive volume (inorganic scintillator).

Preferably, the photosensors are semiconductor type photosensors. This achieves a more lightweight and compact nature compared to the option of using position-sensitive photomultiplier tubes or photomultiplier tube arrays. A further advantage of the use of semiconductor type photosensors is due to their low electrical consumption, low amperage and low operating voltage (tens of volts compared to hundreds/thousands of volts required by conventional photomultiplier tubes), which is an advantage for the use thereof in applications requiring a small volume and/or portability.

As described above, in the detection module, at least one of the detection volumes can be a detector with neutron-gamma discrimination capability. The detectors with discrimination capability will preferably be monolithic or pixelated scintillation crystals. Furthermore, they are optically coupled to position-sensitive photosensors or photomultipliers.

In another aspect of the invention, the detector module comprises more than two gamma radiation detectors. The plurality of detectors can be arranged in two, three or more different planes (preferably parallel to one another). This allows three or more interactions of one and the same gamma ray to be recorded in temporal coincidence, enabling a better reconstruction of the gamma image in the high-energy range (>5 MeV) and a better reconstruction of the energy spectrum and therefore of the identification of the radiation-emitting isotope.

Likewise, the detection in three or more volumes of incident gamma radiation allows for a better reconstruction of the image particularly where the gamma radiation source and, therefore, the initial gamma ray energy are unknown.

In another aspect of the invention, in the detection module, the distances between the detection volumes may be varied dynamically in a discrete or continuous manner in order to optimise the output of the detector module in terms of gamma image resolution and efficiency, which provides greater versatility and expands the possible applications of the device.

In another aspect of the invention, the detection module, comprising a data visualisation display to show images of gamma radiation and neutron sources, further includes an RGB or RGB-D (Red Green Blue-Depth) type optical camera which allows the radiation image to be fused with the visible image, allowing for a rapid location of any type of emission source.

In another aspect of the invention, the system can be complemented with machine vision methods. These methods, such as Aruco type binary fiducial markers, for example, allow the pose of the system for detection to be estimated, providing a correspondence between the real (3D) positions and the RGB projected or measured (2D) images thereof using the RGB camera.

Additionally, the device uses these methods and a combination of multiple measurements or poses for calculating three-dimensional spatial distributions of the recorded emission sources.

In another aspect of the invention, the device can further comprise a thermal camera in order to contrast images in the field of view as well as the gamma radiation image, the neutron image and the thermal map of the field of view.

In another aspect of the invention, the opening of the collimator can be supplemented with inserts or lenses, with a geometry such that they allow an appropriate reduction in the size of the opening, thus allowing greater spatial resolution for the neutron image and greater versatility of the system.

In summary, the small size and weight of the device object of the invention translate into high portability, which represents a fundamental advantage for medical applications in which the device must be integrated into a particular medical environment. Portability is crucial for inspections relating to safety and defence onboard unmanned flight systems, as well as in applications for controlling radioactive material (nuclear power plant decommissioning, waste monitoring, nuclear accidents), where the device may need to be transported and operated by humans.

The invention therefore proposes a solution to the technical problems described in the preceding sections, and provides a device for simultaneous detection of gamma radiation and neutron sources, which allows both types of sources to be located simultaneously by means of a single measurement.

DESCRIPTION OF THE DRAWINGS

To complement the description that is being made and for the purpose of helping to better understand the features of the invention according to a preferred practical exemplary embodiment thereof, a set of drawings is attached as an integral part of said description in which the following is depicted in an illustrative and non-limiting manner.

PREFERRED EMBODIMENT OF THE INVENTION

A preferred embodiment of the device for simultaneous detection of gamma radiation and neutron sources is described below with the aid of FIGS. 1 and 2.

Figure 1:
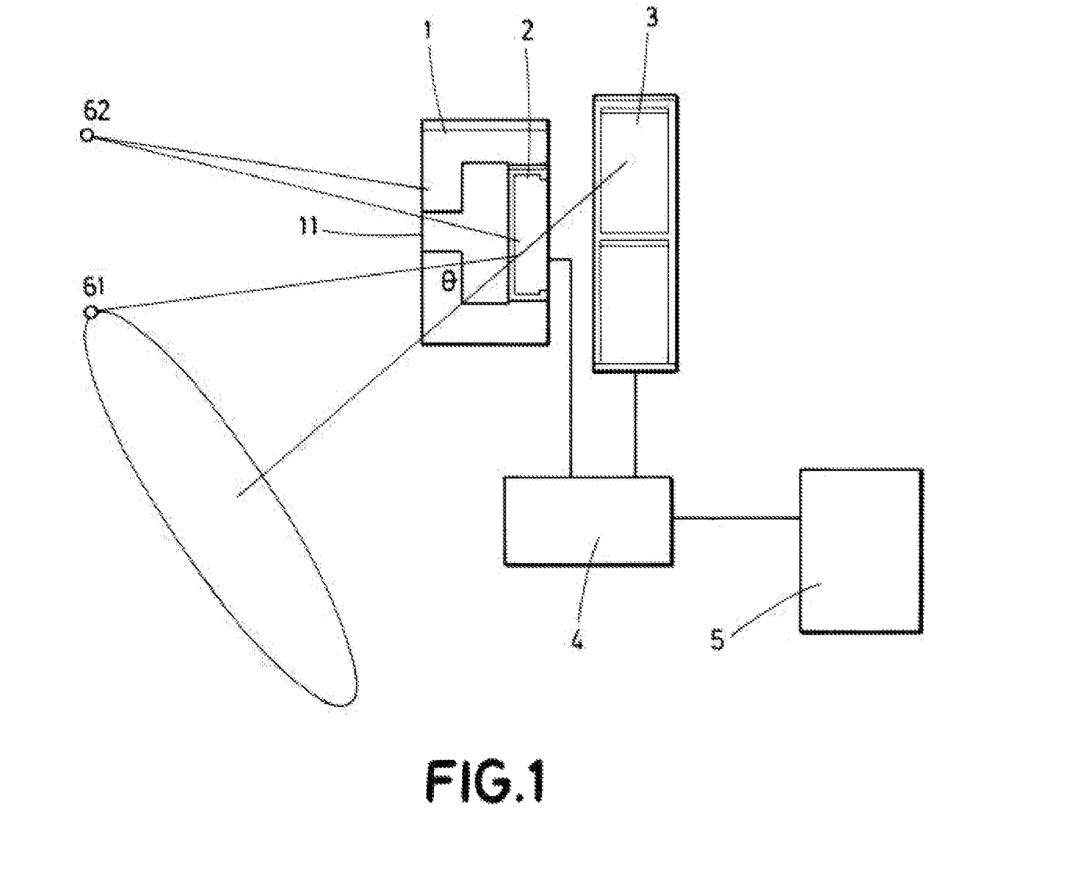
FIG. 1.—Shows a cross-section of the mechanical collimator with a pin-hole geometry coupled to the detector module, connected to the processing and acquisition module, illustrating the principle of simultaneous detection and location of neutron sources and gamma radiation sources.

As shown in FIG. 1, the device, which is preferably portable, first comprises a mechanical collimator (1), which is positioned in front of an emission source (61, 62), which can be a gamma radiation emission source (61) and/or a neutron source (62).

To be detectable, the emission source (61, 62) can be located at any point in space. However, to be able to image same, the emission source (61, 62) should preferably be in front of the mechanical collimator (1) in the field of view thereof, which can be adjusted as described below.

The mechanical collimator (1) is what will allow imaging of the neutron source (62), given that it is based on a material that has a high neutron absorption capacity but is essentially transparent to gamma radiation, such as, for example, polyethylene enriched with $^6$Li, i.e., lithium-doped polyethylene preferably isotopically enriched with $^6$Li, $^6$Li(CH$_2$)$_n$, or other lightweight materials with a high neutron absorption coefficient such as $^{nat}$LiH, $^6$LiH, $^6$Li$_2$CO$_3$, $^{10}$B—(CH$_2$)$_n$, etc.

The mechanical collimator (1) is a pin-hole type collimator, the neutrons accessing its interior primarily through an inlet opening (11), as indicated in FIG. 1. Moreover, the mechanical collimator (1) blocks most of the neutrons that are not incident through the inlet opening (11) thereof.

The device further comprises a detector module coupled to the mechanical collimator (1), on the face opposite that of the gamma ray emission source (61) and neutron emission source (62), and also depicted in FIG. 1. The detector module comprises a series of detector volumes, one of them being a first detector (2) with gamma-neutron discrimination capability and furthermore sensitive to the interaction positions of the particles with the other active detector volumes in the module. The first detector (2) can be, for example, a monolithic or pixelated scintillator crystal coupled to a position-sensitive photosensor, such as for example a position-sensitive photomultiplier tube or a pixelated silicon photomultiplier.

The mechanical collimator (1) can completely envelope the detector module, with the exception of the collimation inlet opening (11), or it can partially envelope it as in the preferred embodiment shown in FIG. 1, in which it envelopes the first detector (2), the configuration of which assumes that the neutron sources (62) are located in the front part of the device. Said configuration allows volume to be reduced and the planes of different detector volumes to be brought closer together, allowing for greater versatility in terms of spatial resolution features.

The combination between the mechanical collimator (1) and the first detector (2) of the detector module acts like a pin-hole camera for neutrons, thus enabling inverted optical imaging of the neutron source (62) which could be a point source or a spatially distributed source. This operation is similar to that of an Anger camera for gamma radiation, in which a pin-hole type collimator manufactured with a heavy material (generally tungsten or lead) coupled to a radiation detector position-sensitive or to an array of radiation detectors, is used.

This concept is schematically depicted in FIG. 1, where it is illustrated how only neutrons that are incident in the inlet opening (11) of the mechanical collimator (1) actually cause a signal or interaction in the first detector (2).

The mechanical collimator (1) is particularly effective in absorbing low-energy neutrons across the entire energy range comprised between thermal neutrons (0.025 eV), slow neutrons, and up to intermediate energies (hundreds of eV). The efficacy of the mechanical collimator (1) in neutron absorption and therefore in imaging the neutron source (62) depends on the energy of said neutrons and on the thickness of the mechanical collimator (1). Therefore, the thickness of the mechanical collimator (1) for neutrons can be optimised for each specific application.

Figure 2:
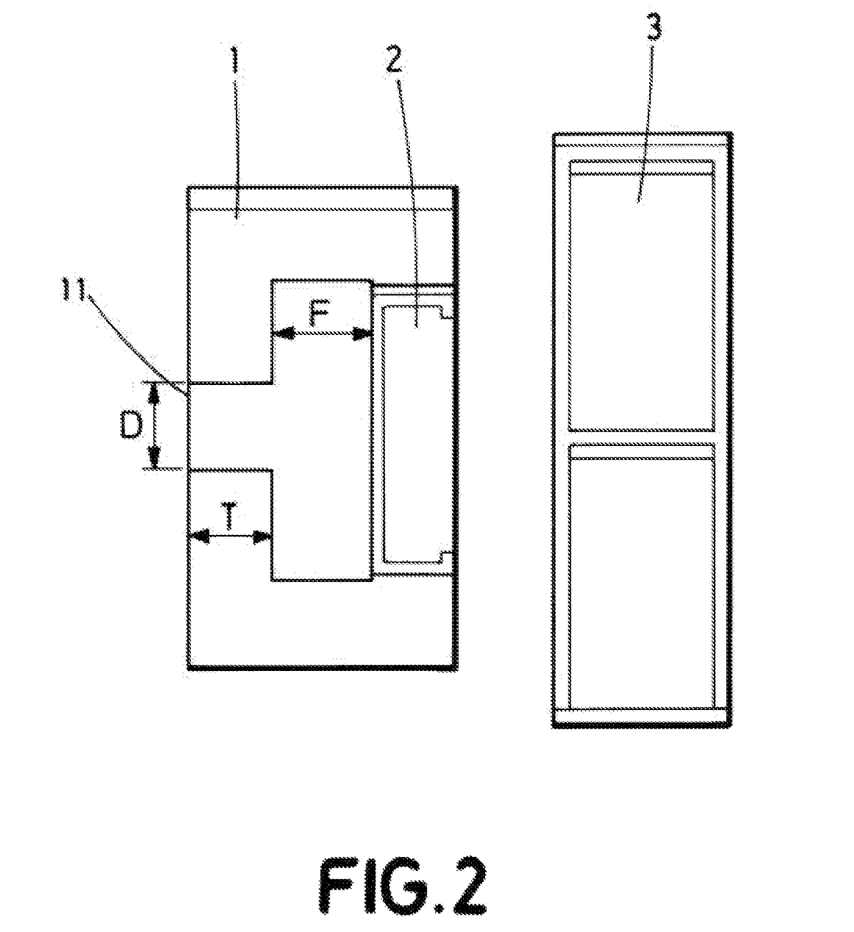
FIG. 2.—Shows a cross-section of the mechanical collimator coupled to the detector module, showing in detail the key parameters of the mechanical collimator (F focal distance, D diameter of the inlet opening and T thickness of the collimator).

The thickness of the mechanical collimator (1) is depicted by the letter T in FIG. 2. Said thickness of the mechanical collimator (1) will determine the energy range for which imaging of the neutron source (62) is possible. By way of example, for thicknesses of 2-3 cm the energy range of the neutron for which imaging is possible ranges from thermal values (eV) up to intermediate energies (hundreds of eV).

FIG. 2 also depicts other characteristic and adjustable dimensions of the mechanical collimator (1), such as the focal distance (F) and the diameter (D) of the inlet opening (11). These parameters allow adjusting or determining the spatial (angular) resolution of the system for neutron imaging, the field of view and the detection efficiency. In one embodiment of the invention, the thickness of the collimator (T) can be adjusted or varied by means of a series of collimators fitting inside one another. Both the aperture (D) of the mechanical collimator (1) and its geometry can be varied by means of a system of inserts or lenses housed inside the main inlet opening (11) shown in FIG. 1.

In the case of the first detector (2) of the present invention, it can be any scintillator crystal with neutron-gamma discrimination capability, particularly sensitive to thermal neutrons. Among the various crystals with these characteristics, CLYC6 type crystals enriched with $^6$Li are preferably contemplated for this use due to the high cross-section of the reaction $^6$Li+n=$^3$H+α in the thermal zone of the neutron energy spectrum.

To be able to detect and quantify neutron or gamma particle events with the first detector (2), the device comprises a processing and acquisition module (4), also depicted in FIG. 1 and connected to the detector module. The identification of neutron type events and discrimination with respect to gamma radiation is performed with conventional response function or pulse shape analysis techniques.

Furthermore, connected to the processing and acquisition module (4), the device comprises a visualisation module (5) which allows the visualisation of the information obtained in the processing and acquisition module (4) as well as the images of the gamma radiation sources (61) and the neutron sources (62).

Moreover, for gamma imaging, the detector module comprises a gamma radiation detector (3) sensitive to the radiation interaction position, arranged after the first detector (2), as shown in FIGS. 1 and 2. The combination of the first detector (2) and the gamma radiation detector (3) in the detection module allows a gamma image to be obtained, which image is shown in the visualisation module (5), by the conventional electronic or Compton type collimation technique, since the mechanical collimator (1) virtually does not interfere for electromagnetic radiation in the electronic collimation.

Depending on the thickness (T) of the mechanical collimator (1), said collimator will be virtually transparent to gamma rays above a certain energy value. In the example of a thickness of 2-3 cm, the collimator is virtually transparent to gamma radiation for energies above about 250 keV. This is the energy range for which the device object of invention allows gamma imaging, by means of the electronic (Compton) collimation technique, without needing to use other elements, as a result of the two detection volumes (2, 3), and as a result of the mechanical collimator (1) not interfering in this process. Likewise, for a lower energy range it is possible to obtain a gamma image by applying filters or corrections to correct the effect of the mechanical collimator (1).

For thicknesses (T) of the mechanical collimator (1) of 3-5 cm, it is possible to visualise neutron sources (62) with higher energies, reaching neutron energies of 100 keV. In this case, the gamma radiation energy range after which imaging is possible without interference from the mechanical collimator (1) is after about 400-500 keV. Again, in the lower energy range inferior it is still plausible to obtain an artefact-free image by applying specific corrections due to the mechanical collimator (1).

The gamma radiation detector (3) does not necessarily have to exhibit neutron-gamma discrimination capability, since it is only necessary for gamma imaging. The gamma radiation detector (3) exhibits high-energy resolution in order to improve the spectroscopic identification and in order to precisely determine the energy of the incident radiation, which results in higher resolution of the obtained image and in the precise identification of the gamma radiation-emitting radioisotopes.

To increase gamma detection efficiency, the gamma radiation detector (3) comprises an array of four, preferably monolithic, crystals which can be, for example, lanthanum halide LaBr$_3$(Ce) or LaCl$_3$(Ce) crystals. Each crystal preferably has a parallelepipedic geometry. It can likewise comprise monolithic crystals or arrays of crystals (pixelated crystals). Position sensitivity is obtained by coupling each crystal, or array of pixelated crystals, to a pixelated or position-sensitive photosensor. This can be a pixelated photomultiplier tube, or a pixelated silicon photomultiplier.

In one aspect of the invention, the device may comprise more than one gamma radiation detector (3), one or several of which can furthermore be sensitive to thermal neutrons, which allows the neutron detection efficiency to be expanded and the signal-to-background ratio in gamma radiation and neutron images to be improved. Furthermore, one of the gamma radiation detectors (3) can be also sensitive to fast or high-energy neutrons (keV-tens of MeV), so the device also serves for detecting the presence of high-energy neutrons.

The image of the gamma radiation emission source (61) can be taken by applying the Compton technique, in which a Compton cone, such as the one shown in FIG. 1, can be calculated, event-by-event, from the energies measured in the detector volumes (2, 3) and from the interaction positions of the gamma radiation measured in the same detector volumes (2, 3). The aperture of this cone is depicted in FIG. 1 as θ and is determined by the Compton scattering law for radiation:

$$\frac{1}{E_{\gamma,i}} - \frac{1}{E_{\gamma,f}} = \frac{h}{m_e c^2}(1-\cos\theta)$$

where $E_{\gamma,i}$ and $E_{\gamma,f}$ are the energies of the incident gamma ray and of the scattered gamma ray, respectively, h is Planck's constant, $m_e c^2$ represents the electron mass (511 keV) and θ corresponds to the Compton scattering angle formed between the direction of the incident gamma ray and the scattered gamma ray. For a sufficiently thick absorbent detector, it can be assumed that $E_{\gamma,f}=E_2$, where $E_2$ is the energy measured with the gamma radiation detector (3). If the incident radiation energy is unknown, as a good approximation it can be assumed for a wide energy range that $E_{\gamma,i}=E_1+E_2$, where $E_1$ is the energy measured in the first detector (2).

To increase the gamma energy range in which imaging can be performed, it is possible to add additional gamma radiation detectors (3), after the first gamma radiation detector (3), in successive planes.

Reconstruction of the image of the gamma radiation source (61) is possible by means of backprojection methods, statistical methods of maximum likelihood and other similar techniques amply described in scientific literature.

Lastly, an object of the present invention relates to a method for simultaneous detection of a gamma radiation source (61) and a neutron source (62), comprising the steps of:
- positioning the device in a scene to be inspected,
- acquiring a plurality of gamma radiation and neutron measurements,
- acquiring an image in the visible spectrum recorded with RGB or RGB-D cameras, and with the possibility of being supplemented with machine vision techniques,
- discriminating signals recorded in the first detector (2) with neutron-gamma discrimination capability, identifying in each case whether it is gamma radiation or a neutron,
- imaging the neutron source (62) with the signals recorded in the first detector (2),
- reading signals recorded in the detector volumes (2, 3),
- imaging the gamma radiation source (61) with the signals recorded in the detector volumes (2, 3) in temporal coincidence,
- superimposing the gamma and neutron images obtained in the preceding steps over the visible image recorded with the RGB or RGB-D camera for that detection pose,
- quantifying the activities of the gamma radiation source (61) and neutron source (62) in the field of view of the system for detection,
- reconstructing in three-dimensional space the distribution of the gamma radiation source (61) and neutron source (62) from the data acquired in the various poses.

The invention claimed is:

1. A device for simultaneous detection, identification, quantification and location of a gamma radiation source and a neutron source, the device comprising:
   a mechanical collimator for neutrons that is transparent to gamma radiation, intended for being positioned in front of the gamma radiation source and neutron source, wherein the mechanical collimator is of a type selected from a pin-hole, slit, parallel hole, converging, diverging, multiple pin-hole and coded mask type mechanical collimator,
   a detection module, comprising:
      a first detector with neutron detection and/or gamma-neutron discrimination capability, coupled to the mechanical collimator,
      one or more gamma radiation detectors, positioned after the first detector, on a face opposite the mechanical collimator,
      wherein the first detector and the one or more gamma radiation detectors form a Compton camera;
   a processing and acquisition module, associated with the first detector and with the gamma radiation detectors, and configured to select time-coincident events between detectors and to apply a Compton imaging technique.

2. The device of claim 1, wherein the device further comprises a visualisation module connected to the processing and acquisition module, configured for visualising a reconstructed image of the spatial location of gamma radiation emission source and/or of neutron source.

3. The device of claim 1, wherein the detection module further comprises an optical RGB or RGB-D (Red Green Blue-Depth) camera.

4. The device of claim 3, wherein the optical camera further comprises Aruco type machine vision elements.

5. The device of claim 1, wherein the device further comprises a mechanism for mechanical modification of the focal distance of the mechanical collimator.

6. The device of claim 1, wherein the device further comprises a mechanism for modification of the geometry and/or of the collimation aperture of the mechanical collimator.

7. The device of claim 1, wherein the device further comprises one or more photosensors optically coupled to the first detector and/or to the gamma radiation detector.

8. The device of claim 7, wherein the photosensors optically coupled to the first detector and/or to the gamma radiation detector are pixelated semiconductor type photosensors.

9. The device of claim 1, wherein the gamma radiation detector comprises an inorganic scintillator crystal coupled to a semiconductor photosensor or to one or more pixelated photomultipliers.

10. The device of claim 1, wherein the mechanical collimator can be uncoupled from the first detector.

11. The device of claim 1, wherein the gamma radiation detector can be uncoupled from the first detector.

12. The device of claim 1, wherein the device further comprises a mechanism for regulating the separation between the first detector and the gamma radiation detector.

13. The device of claim 1, wherein the mechanical collimator is made of a material selected from $^6$Li(CH$_2$)$_n$, $^{nat}$LiH, $^6$LiH, $^6$Li$_2$CO$_3$ and $^{10}$B—(CH$_2$)$_n$.

14. The device of claim 1, wherein one of the gamma radiation detectors is additionally sensitive to low-energy neutrons in the thermal neutron (0.025 eV) to slow neutron (eV) range.

15. The device of claim 1, wherein one of the gamma radiation detectors presents neutron-gamma discrimination capability and is sensitive to high-energy neutrons (keV-tens of MeV).

16. The device of claim 1, wherein the gamma radiation detector comprises a plurality of detectors parallel to one another in different planes.

17. The device of claim 1, wherein the device further comprises a thermal camera associated with the processing and acquisition module.

18. A method for simultaneous detection, identification, quantification and/or location of gamma radiation and neutron sources, using a device that comprises:
   a mechanical collimator for neutrons that is transparent to gamma radiation, intended for being positioned in front of a gamma radiation source and neutron source, wherein the mechanical collimator is of a type selected from a pin-hole, slit, parallel hole, converging, diverging, multiple pin-hole and coded mask type mechanical collimator, a detection module, comprising:
  a first detector with neutron detection and/or gamma-neutron discrimination capability, coupled to the mechanical collimator,
  one or more gamma radiation detectors, positioned after the first detector, on a face opposite the mechanical collimator,
  wherein the first detector and the one or more gamma radiation detectors form a Compton camera;
a processing and acquisition module, associated with the first detector and with the gamma radiation detectors, and configured to select time-coincident events between detectors and to apply a Compton imaging technique, wherein the method comprises the steps of:
  positioning the device in a scene to be inspected,
  acquiring a count rate over a certain time in the detector module,
  discriminating signals recorded in the first detector, identifying whether the signal is radiation gamma or a neutron,
  imaging the neutron source with the signals recorded in the first detector,
  processing signals recorded in the detector module identified as gamma radiation events and selecting events in time-coincidence for applying the Compton imaging technique,
  imaging the gamma radiation source with the signals recorded in the detector module,
  acquiring an optical image and/or photograph,
  superimposing the obtained images to spatially locate the sources in the environment of the device based on visual references,
  identifying neutrons and/or gamma particles from the signals recorded in the detector module, and
  quantifying the activity of the neutron sources and of the gamma radiation sources from the recorded count rates and obtained images.

* * * * *